United States Patent
Eberlein

(10) Patent No.: US 9,569,283 B2
(45) Date of Patent: Feb. 14, 2017

(54) WRITE BACK OF DOCUMENTS OPENED IN THIRD-PARTY APPLICATIONS

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 454 days.

(21) Appl. No.: 14/170,087

(22) Filed: Jan. 31, 2014

(65) Prior Publication Data

US 2015/0220576 A1    Aug. 6, 2015

(51) Int. Cl.
*G06F 17/30* (2006.01)
*G06F 9/54* (2006.01)

(52) U.S. Cl.
CPC ........................ *G06F 9/54* (2013.01)

(58) Field of Classification Search
CPC ................. G06F 17/30011; G06F 17/30286; G06F 17/30067; G06F 9/54
USPC ........................ 707/637, 638, 639
See application file for complete search history.

(56) References Cited

U.S. PATENT DOCUMENTS

| | | | | |
|---|---|---|---|---|
| 7,130,863 B2 * | 10/2006 | Diab | | G06F 8/24 |
| 2007/0276795 A1 * | 11/2007 | Poulsen | | G06Q 90/00 |
| 2007/0288525 A1 * | 12/2007 | Stakutis | | G06F 11/1461 |
| 2008/0127292 A1 * | 5/2008 | Cooper | | G06F 21/53 726/1 |
| 2012/0290486 A1 * | 11/2012 | Dobrowolski | | G06Q 50/16 705/307 |
| 2013/0007074 A1 * | 1/2013 | Weicher | | G06F 21/6209 707/821 |
| 2015/0143501 A1 * | 5/2015 | Cherukuri | | H04L 63/02 726/11 |
| 2015/0193267 A1 * | 7/2015 | Shafer | | G06F 9/468 719/320 |

* cited by examiner

*Primary Examiner* — Albert Phillips, III
*Assistant Examiner* — Loc Tran
(74) *Attorney, Agent, or Firm* — Jones Day

(57) ABSTRACT

Embodiments of the present disclosure may include a system and method for passing documents between sandboxed applications in an efficient manner. When a document is passed from a source application to a target application, information regarding when the document was passed and to which application the document was passed to is stored in a document history table. Once the document is passed back to the source application, a document matching manager relies on information stored in the history table to determine if the document being passed back should overwrite a previous version of the document. If the document matching manager cannot determine that the previous version of the document should be overwritten, a user may be prompted to store the document at a desired location.

20 Claims, 6 Drawing Sheets

| Row | Repository ID | Document ID | Name | Modification Date | ... |
|---|---|---|---|---|---|
| 1 | mydocs | 7e814d00fe | sales 2013.xls | 2013-09-11 14:03:03 | ... |
| 2 | mydocs | 919823ddc4 | customers.doc | 2013-04-03 17:44:12 | ... |
| 3 | corporate | 5d9c990034 | sales 2013.xls | 2013-09-14 09:12:42 | ... |

510

| Row | Filename | Target App | Open in Date | Document Ref. |
|---|---|---|---|---|
| 1 | sales 2012.xls | com.acme.calc | 2012-11-09 12:02:01 | 1 |
| 2 | customers.doc | com.acme.notepad | 2013-04-18 07:12:11 | 2 |
| 3 | sales 2013.xls | com.acron.tables | 2013-09-02 16:13:33 | 1 |
| 4 | sales 2013.xls | com.acme.calc | 2013-09-12 19:09:55 | 1 |
| 5 | sales 2013.xls | com.acme.calc | 2013-09-18 10:00:55 | 3 |

WRITE BACK OF DOCUMENTS OPENED IN THIRD-PARTY APPLICATIONS

BACKGROUND

The present invention relates to accessing, modifying, and storing documents that may be associated with sandboxed applications on a computing device.

Mobile devices are becoming commonplace for both personal and business settings for many consumers. Like traditional computing devices, mobile devices are susceptible to security breaches. Thus, mobile developers utilize several techniques, such as "sandboxing," to isolate mobile applications from each other (sandboxing is also used in other computing devices, such as laptops and desktops for increased security and stability). Essentially, in a sandboxed environment, an operating system (OS) for a mobile device isolates each of the applications installed on the device. In other words, an application is only allowed to access or modify data inside of its own "sandbox." Thus, if there is a corrupt application, it is prevented from harming other applications or accessing/modifying data associated with those other applications. This is especially important because some applications have access to sensitive business or personal information that needs to be protected. Although sandboxing has several advantages, there are also some disadvantages.

For example, many mobile applications do not have integrated editing tools. Thus, users may need to rely on third-party editing applications. As a consequence of sandboxing, documents now need to be explicitly passed between mobile applications using an "Open in" feature or the like to enable editing of documents. FIG. 1 is a diagram illustrating a document being "passed" between two applications, namely, Application 1 and Application 2. Sandbox 102 is associated with Application 1 and sandbox 104 is associated with Application 2. Assume Application 1 does not have editing capabilities but Application 2 does.

During "Event 1," a user can open a document, say Doc. A, that is associated with sandbox 102 using Application 1. If the user wants to edit Doc. A, he/she cannot do so using Application 1. Thus, the user can use an "Open in" feature in Application 1 to open Doc. A with an editing software, Application 2 (within sandbox 104). Once the user opens and edits the document using Application 2, a new document is created, Doc. A'. In this instance, the original Doc. A is still stored in sandbox 102 while the new document Doc. A' is opened in Application 2.

During "Event 2," a user can pass back the edited version of the document Doc. A' back to Application 1 by using an "Open In" feature in Application 2. The edited version of the document Doc. A' is subsequently opened in sandbox 102 associated with Application 1. However, once the edited document is passed back, it is saved as another document, Doc. A', in sandbox 102. Thus, sandbox 102 now contains two versions of the same document, Doc. A and Doc. A'. This is because the Applications 1 and 2 are sandboxed, therefore once a document (in this case a version of a document) is "passed" out of either application, the application no longer has access to the "passed" version of the document and cannot correlate it to an updated document version when that is passed back to the original application. Thus, traditional methods of passing documents between sandboxed applications result in an unnecessary duplication of documents. Users may have to manually replace old version of documents with new, edited versions of documents, which is tedious.

These problems are not as significant if both the source and target application adhere to a common protocol. For example, together with the actual document (Doc A) and its name in the "Open In" feature, the source application can pass an "annotation" to the target application. The annotation can contain an unique identifier that allows the source application to match a received document passed back by the target application when the document is returned in another "Open In" call. For example, the annotation may be a dictionary containing the application-to-application integration uniform resource locator ("URL") of the document, which is also used to launch the application in order to display the document.

This approach works for in-house applications that are implemented in a way to support the defined annotation protocol. For integration with third-party applications, this does not work because they are not aware of the annotation format and what they are supposed to do with the received annotations. Moreover, third-party application developers may not be inclined to adopt such a protocol if it's made available to them. Thus, a more universal concept is needed.

BRIEF DESCRIPTION OF THE DRAWINGS

FIG. 5 illustrates two tables storing information related to documents being passed back and forth between sandboxed applications.

DETAILED DESCRIPTION

Embodiments of the present disclosure may include a system and method for passing documents between sandboxed applications in an efficient manner. When a document is passed from a source application to a target application, information regarding when the document was passed and to which application the document was passed to is stored in a document history table. Once the document is passed back to the source application, a document matching manager relies on information stored in the history table to determine if the document being passed back should overwrite a previous version of the document. If the document matching manager cannot determine that the previous version of the document should be overwritten, a user may be prompted to store the document at a desired location.

Figure 1:
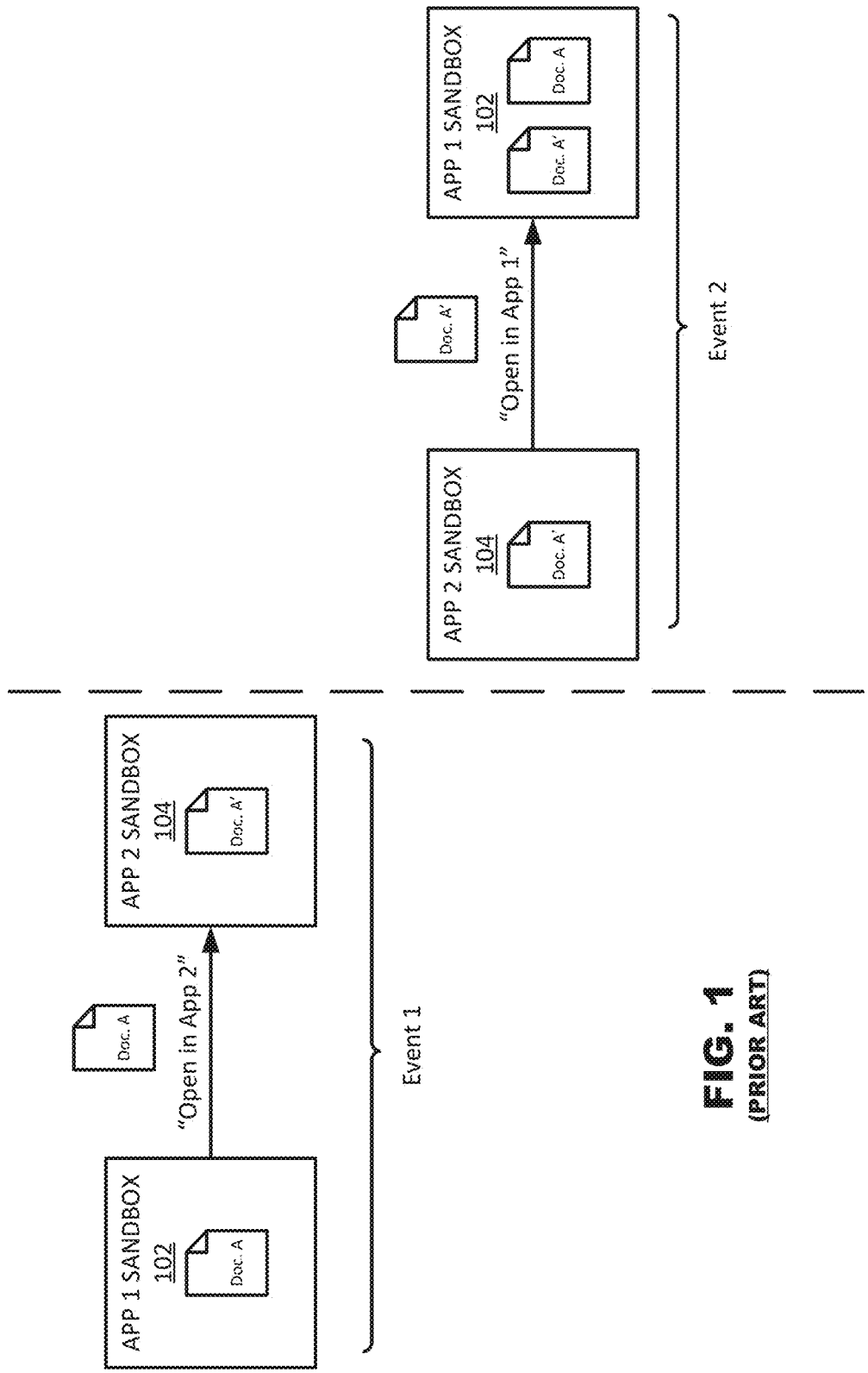
FIG. 1 is a diagram illustrating a document being passed back and forth between sandboxed applications according to traditional techniques.
Figure 2:
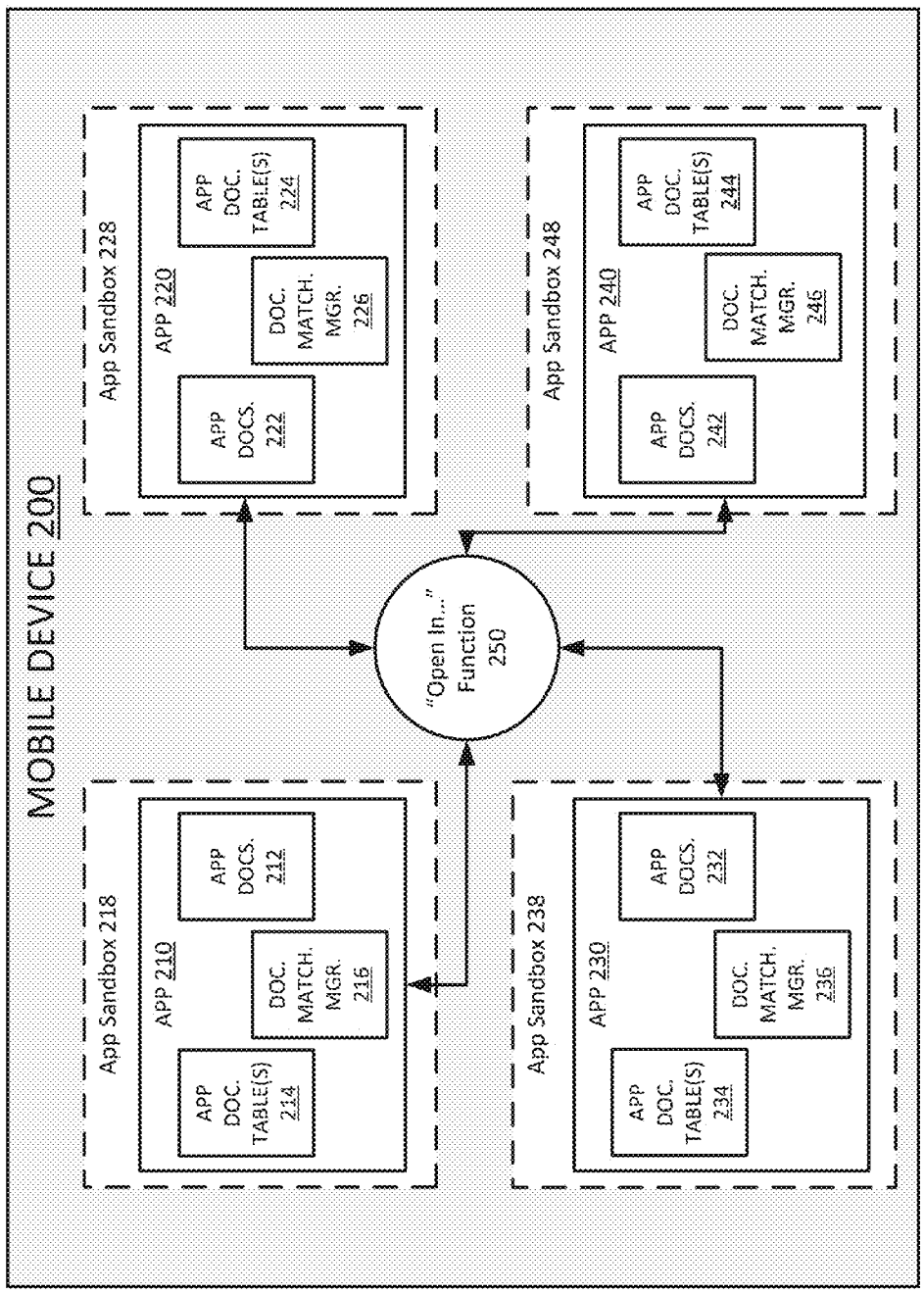
FIG. 2 is a block diagram of a mobile device implementing an embodiment of the present disclosure.

FIG. 2 is a block diagram illustrating a mobile device 200 according to an embodiment of the present disclosure. The mobile device may include a plurality of applications 210-240 which may be stored in memory and executed by a processor (both shown in FIG. 6). Each application 210-240 may operate within a corresponding sandbox 218-248, which may isolate a given application from the other applications running on the mobile device 200. Each application 210-240 may also include corresponding application documents 212-242, document tables 214-244, and document matching managers 216-246.

The mobile device 200 may be a smart phone, a laptop, a tablet, or the like. Moreover, the principles described herein may apply to any computing device, such as the computing device described with respect to FIG. 6.

The application documents 212-214 may be associated with each application 210-240, respectively. The documents may be stored in a given sandbox 218-248 associated with each application 210-240. The table (or list) of documents 214-244 associated with each given application 210-240 may store a list of the documents 212-242 associated with each given application and other relevant information about each document (described in more detail below with respect to FIGS. 3-5). According to some embodiments, there may be one or more related tables associated with each application 210-240. The documents 212-242 associated with each application 210 may be opened in other application sandboxes 218-248 by using an "Open In" action 250. For example, if a document is currently associated with application 210, a user may use the "Open In" function 250 to open the document in the sandbox 238 of application 230.

Figure 6:
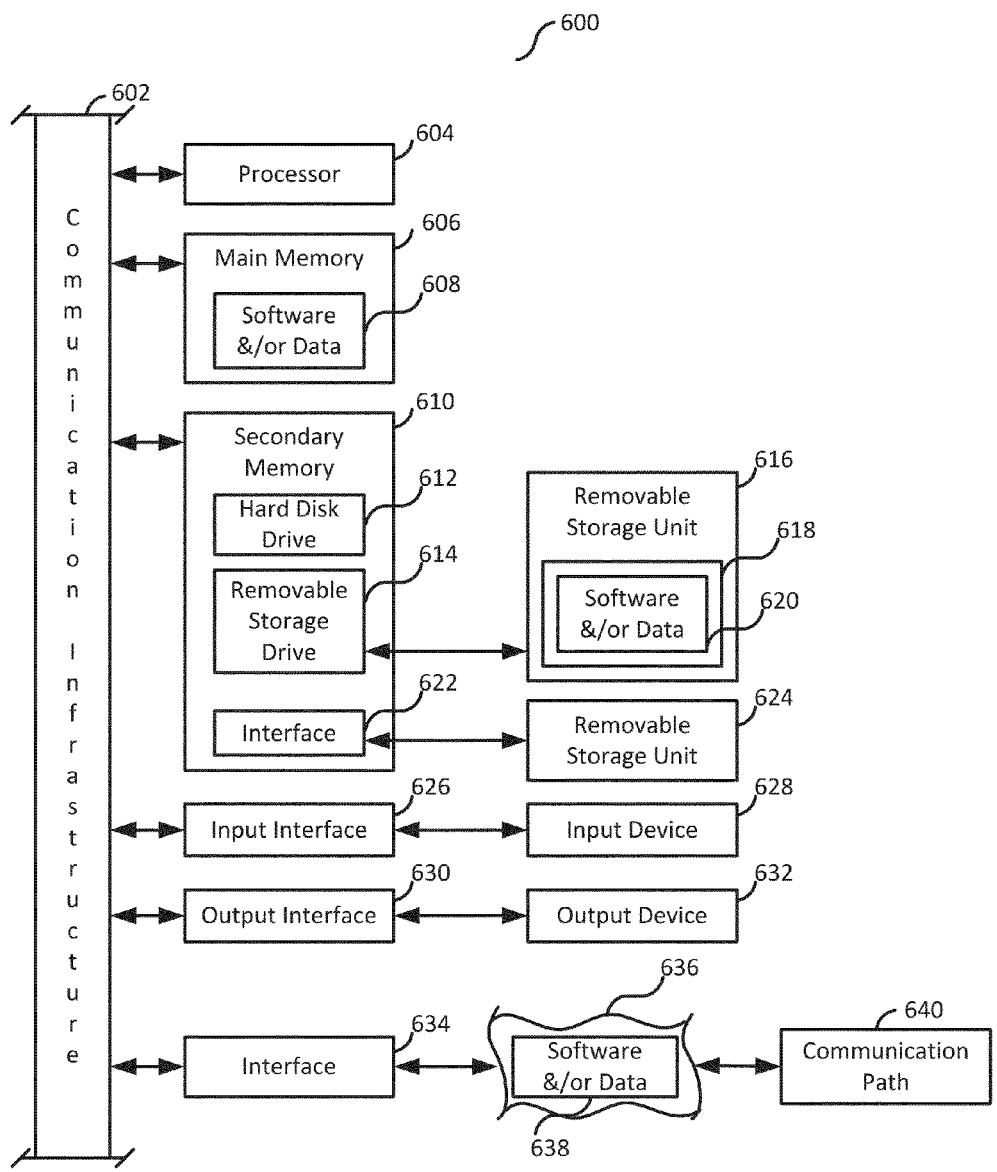
FIG. 6 illustrates an example computer system in which one or more embodiments of the present disclosure may be implemented as computer-readable code.

Each document matching manager 216-246 associated with each application 210-240, respectively, may be a program stored in memory allocated to each sandbox 218-248 and executed by a processor (both shown in FIG. 6). Each document matching manager 216-246 may access the document tables 214-244 associated with each application 210-240, utilize a matching algorithm (described in the flow chart in FIG. 4), and determine how to manage documents that are checked into and out of respective sandboxes 218-248. The document matching managers 216-214 may also be integrated with corresponding application 210-240, instead of being stand-alone software programs.

Figure 3:
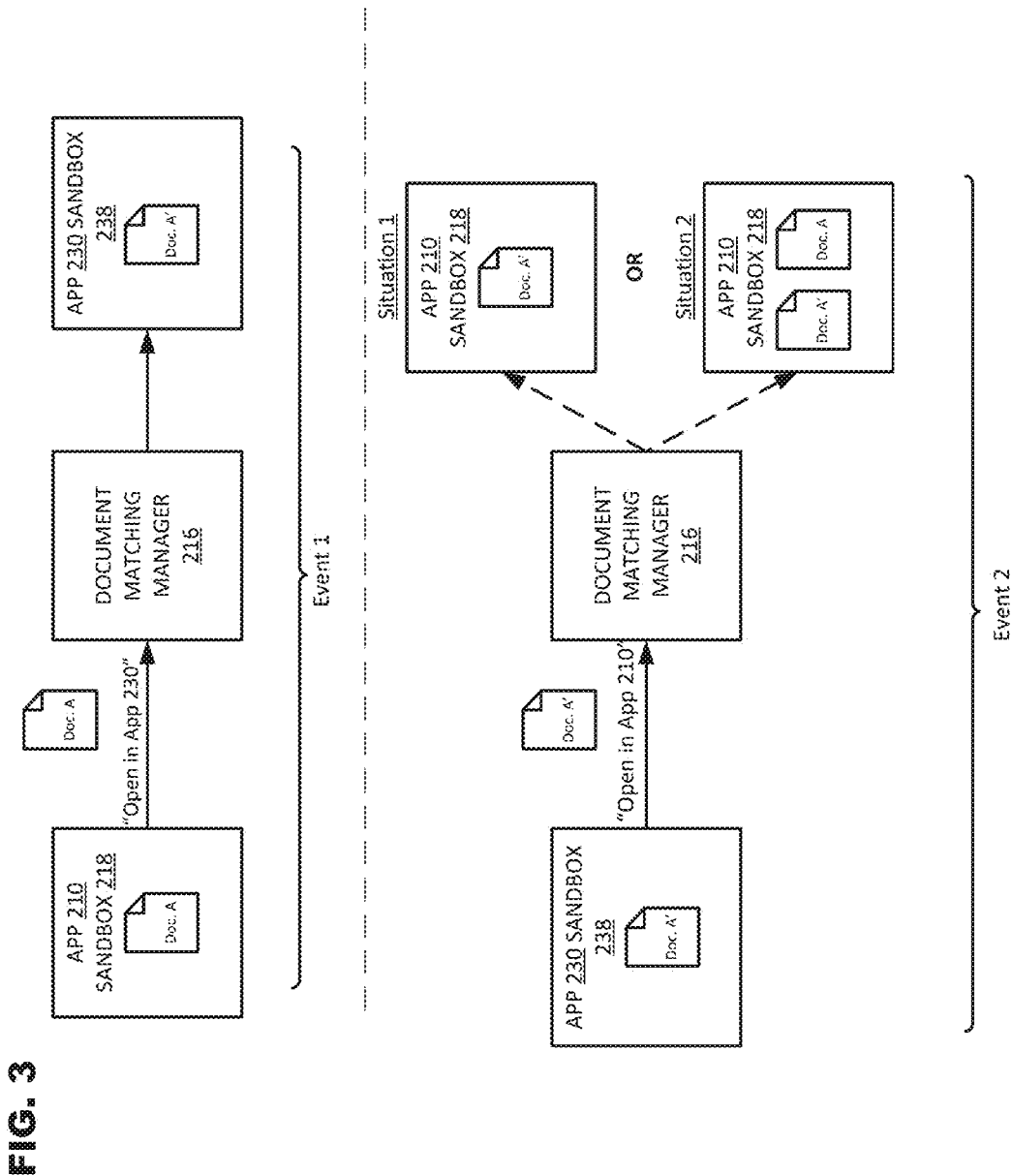
FIG. 3 is a diagram illustrating a document being passed back and forth between sandboxed applications according to an embodiment of the present disclosure.

FIG. 3 is a diagram illustrating how a document, say Doc. A, may be "passed" between application 210 and 230 of FIG. 2 according to an embodiment of the present disclosure. For exemplary purposes, assume application 210 does not have editing capabilities but application 230 does.

During "Event 1," a user may open a document, say Doc. A, that may be associated with sandbox 218 using application 210 (or the "source application"). If the user wants to edit Doc. A, he/she cannot do so using application 210. Thus, the user may use an "Open in" function 250 associated with application 210 to open Doc. A with an editing software, application 230 (or the "target application") within sandbox 236. The document matching manager 216 may update the application document table(s) 214 within sandbox 218 with information that may be used to identify an edited version of the Doc. A when it is opened within application 210 at a later time. This information may include the date/time the document was opened in application 230, the file name of the document at the time it was opened in application 230, the target app (application 230), the last date the document was modified, etc.

Once the user opens and edits the document using application 230, a new document may be created, Doc. A'. In this instance, the original Doc. A is still stored in sandbox 218 while the new document Doc. A' is opened in application 230.

During "Event 2," a user may pass back the edited version of the document Doc. A' back to application 210 by using an "Open in" feature 250 associated with application 230. When the document manager 216 of application 210 receives the "Open in" request, the document manager 216 may access information in the document table(s) 214 in sandbox 218 to determine if Doc. A should be overwritten by the new version Doc. A'. The document matching manager 216 may make its decision based on the current information associated with Doc. A in table(s) 214 and information associated with Doc. A' when it is passed back to application 210. Examples of such information are shown in the tables in FIG. 4, which will be described in more detail below.

If, according to a matching algorithm, the document matching manager 216 determines that Doc. A' is an updated version of Doc. A (situation 1) with an adequate degree of confidence, Doc. A may be over overwritten by new Doc. A'. If, however, the document manager 216 is not confident, the user may be prompted create a new document Doc. A' within sandbox 218 (situation 2). In this case, the documents Doc. A and Doc. A' may be different, and the user may want to have them saved as separate files (e.g., different drafts of a document or completely different documents that just happen to have the same file name). The matching algorithm will be described in further detail below with respect to FIG. 4.

Figure 4:
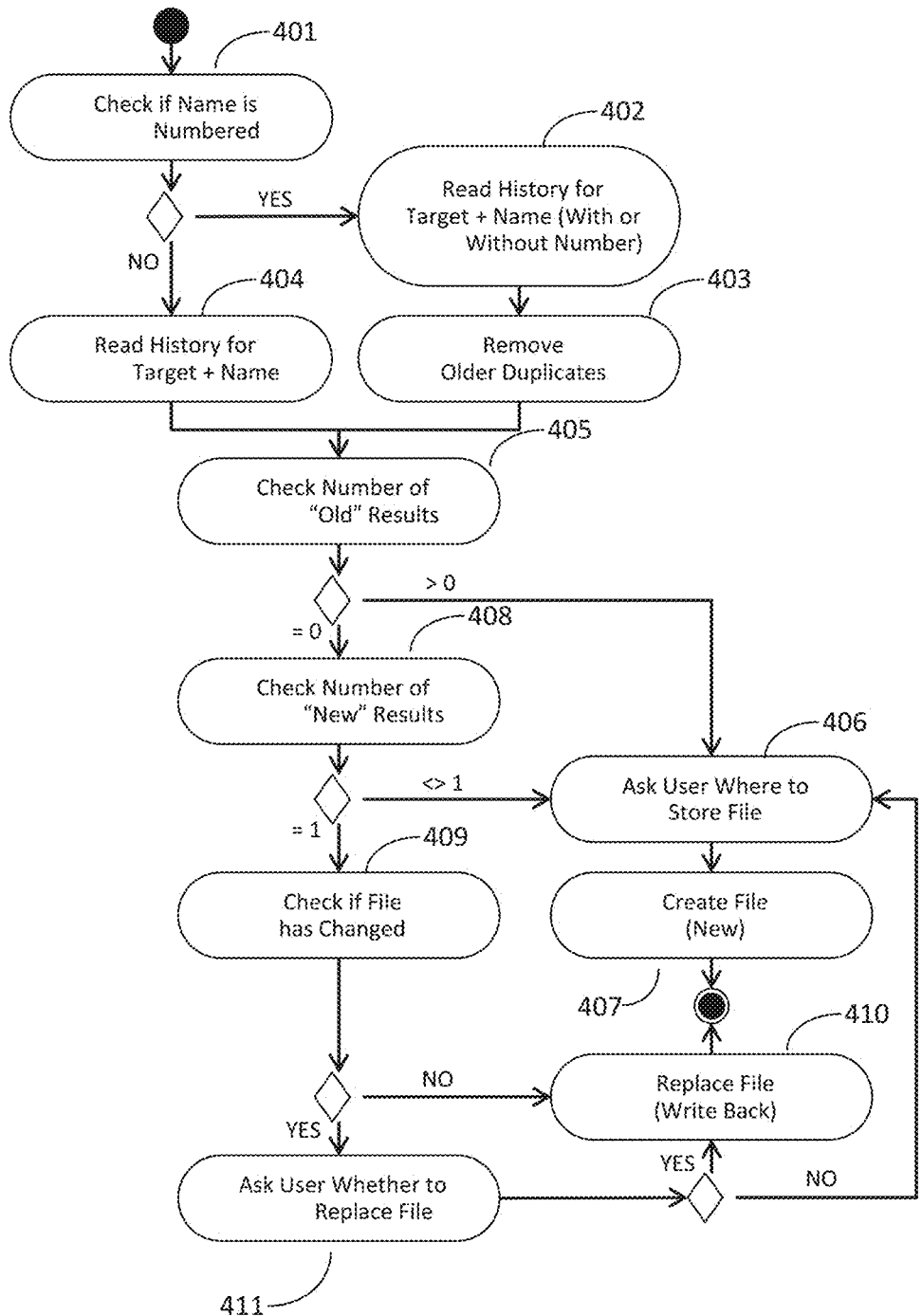
FIG. 4 is a flow chart illustrating a matching algorithm according to an embodiment of the present disclosure.

FIG. 4 is a flowchart of a matching algorithm 400 according to an embodiment of the present disclosure. The algorithm will be described with reference to FIGS. 2 and 3 described above for exemplary purposes. Continuing with the example described in FIG. 3 above, the matching algorithm 400 may be implemented by the document matching manager 216 of application 210 when Doc. A' is passed back to application 210 from application 230 (i.e., "Event 2" in FIG. 3). The document matching manager 216 may rely on a combination of the information in application document table(s) 214 and the matching algorithm 400 to determine if the document being passed back, Doc. A', should overwrite an existing document saved in the sandbox 218 associated with application 210.

At step 401, the document matching manager 216 may check the file name of the document being checked back in to application 210 to see if the file name has a number appended to it (-1, -2, etc.). These numbers may typically be appended to document file names as the documents are passed between mobile applications using the "Open in" feature. If "Yes," the manager 216 may search the document history table(s) 214 for documents with same file name (with and without the appended number) and that were opened in the same target application at step 402. Continuing with the example above, if Doc A (which is associated with application 210) is opened in application 230 (target application), the table 214 may store data indicating that Doc A was once before opened in application 230. Once Doc A' is passed back to application 210 from application 230, the matching manager 216 may match the file name of Doc A' with Doc A. The matching manager 216 may also determine that the documents are likely the same because the same target application (application 230) is involved (e.g., Doc. A was passed out to application 230 and application 230 is now passing the same document back). At step 403, if there are entries for both the file name with appended number and without after the manager 216 performs the search, the older of the two documents may be ignored. If the document does not have a number appended to it, the document matching manager 216 may simply search for the file name as it was passed and the target application (at step 404).

At step 405, the matching manager 216 may analyze the results of potentially matching documents and determine if the results are considered "old." The definition of "old" may be related to the last time the document was passed out of the current application 210 to the target application 230 and defined by a system administrator or application developer.

For example, a document that was passed out of application 210 may be considered "old" if it was passed out more than one day ago. In other systems, a document passed out a few weeks ago may be considered old. If the matching manager 216 determines that a potentially matching document is "old," the manager 216 may move to step 206 and ask the user where to store the file. This is because the manager 216 may not be able to determine if the document that was passed out and the document being passed in are the same document. The user may then create a new file at step 407 if he or she desires.

If, at step 405, the document matching manager 405 determines that no potentially matching document(s) is/are not considered "old," the document matching manager 216 may determine the number of "new" results at step 408. A "new" document may be defined as a document that is not considered to be "old." If there are more than one new documents having a matching name and are being passed back by the same application that the document was previously passed out to, the document matching manager 216 may jump to step 406 and ask the user to store the file. In this instance, the manager 216 may be unable to determine which of the potentially matching documents in the result set matches the document being passed back into the application 210. The user may then create a new file at step 407 if he or she desires.

If, at step 408, the number of "new" results is equal to one, the document matching manager 216 may check the information in the document table(s) 214 corresponding to the single potentially matching document (e.g., Doc. A) to determine if the document has been changed or modified after it was previously passed out (note, as described above, this may be possible because when a document is "passed" out by application 210, a new copy is created in the target application 230 and a local copy of the document is still stored in the sandbox 218 associated with application 210). If the table 214 indicates that the document has not been changed, the document matching manager 216 may replace the existing document with the document being passed back in (e.g., overwrite Doc. A with Doc A' being passed back from application 230 to 210).

If table(s) 214 indicates that the document has been changed, the matching manager 216 may ask the user whether he/she desires to replace (or overwrite) the previous version of the document in the application 210 sandbox 218. If the user desires to do so, the document is overwritten. If the user does not want to replace the file (i.e., the local version of the document contains updates that were made in parallel and should not be lost and therefore the user wants to save a different version of the document), the user may be asked where to store the file at step 406. The user may then create a new file at step 407 if he or she desires.

FIG. 5 illustrates two tables 510 and 520 that may be examples of the application document table(s) 214-242 show in FIG. 2. The tables 510 and 520 may be associated with a single application (e.g., application 210 in FIG. 2). The tables 510 and 520 may be used by a document matching manager (e.g., matching manager 216 in FIG. 2) as described above with respect to FIGS. 2-4 to determine if a document that is being passed back into a given application (e.g., application 210 in FIG. 2) should overwrite an existing document. The tables 510 and 520 will now be described using the same example above in FIG. 3 (i.e., a document being passed from application 210 to application 230 ["Event 1"] and passed back from application 230 to 210 ["Event 2"]).

Table 510 may be a document object table and may contain all of the documents that application 210 manages. In other words, the table 510 may represent a complete view of documents the application 210 stores, independent of any "Open In" actions a user might have taken. The table 510 may contain information related to each document. For example, the table may include a repository identification (ID), a document ID, a document name, a modification date, along with other pertinent information not shown in table 510. The repository ID may be the location where a document may be stored. The document ID may be a unique alpha-numeric code associated with a document within that repository. The document name may be a document's title. A modification date may be a date and time the document was last edited/viewed by a user.

Table 520 may be an "Open In" history table and may contain a history of all outbound "Open In" actions for a subset of documents that may have been passed out to other applications (e.g., application 230). So, there may be multiple entries in table 510 for one document that is listed only once in table 520. There may also be zero entries in table 520 for some documents in table 510 because those documents may have never been passed on to another application using the "Open In" action. The table 520 may include the relevant information associated with each document, such as a document file name at the time the document was passed to a target application, a target application, an "Open In Date," and a document reference number. The document file name may be the document's title. The target application may be an application the document was passed out to. The "Open In Date" may be a date and time the document was passed to a corresponding target application. The document reference number may correspond to the "row" column in table 510 described above.

When a document is written back into source application 210 (i.e., "Event 2" in FIG. 3), the tables 510 and 520 may be used to correlate the received document to the original document that was previously passed to application 230. If the correlation can be done unambiguously, the original document may be replaced with the document that was written back into application 210 (from application 230), solving the problem of document duplication. As described above with respect to FIG. 4, the matching algorithm 400, implemented by the document matching manager 216, may rely on the file name (in table 520) under which a document may have been passed to a target application and a unique identifier for the target application to match a received document to the original document. Both of these pieces of information may be available when the "Open In" action is performed to send a document to another application and also upon a write back from another application occurs.

A combination of these two pieces of information, however, —may refer to different documents, as only the file name can be passed in the "Open In" action but not the folder or repository where the document is stored. For example, in the document object table 510, there are two documents named "sales 2013.xls" but they may reside in two different repositories and may actually be different objects although they have the same file name. When matching documents that are written back to the source application 210, such a situation is detected by the matching manager 216 and the user is prompted to decide which document shall be replaced.

The "Open In Date" in table 520 may also be relied upon by the document matching manager 216. The "Open In Date" may allow the document manager to remove entries from the history table 520 that may be "old" entries (as described above in the algorithm 400 of FIG. 4) or even too old to be regarded by the matching algorithm 400 at all and therefore be removed from the table because the document may likely no longer be stored in the sandbox 238 of application 230 or at least may not be written back from the application 230. An exemplary time frame after which entries are removed may be somewhere in the range between days to years.

There may be instances where a document may have been renamed between the time it was opened in the target application 230 and written back to the source application 210. In such a case, the document object table 510 may contain the updated file name but the history table 520 may contain the original file name under which the document was passed. When the document is written back into application 210, it may be written back under the original file name. When updating such a document in the source application 210, the document with the new name may be replaced with the data from the document passed under the old file name. For example, row 1 of the history table 520 includes a document with a filename of "sales 2012.xls" but references a document which current name may be "sales 2013.xls" because that same document may have been renamed at some point. In such a scenario, the document matching manager 216 may prompt the user to decide if the document should be replaced.

Another potential complication may be related to the way a document is passed to the target application 230. If the target application 230 already contains a document with the same file name in its inbox (e.g., because the same document or some other document with the same file name may have been passed to the application 230 before and it did not get cleaned out of the inbox), the document's file name may be changed during the execution of the Open In action by appending a number to the end of the file name. For example, some systems may add a "-1" to the base file name, or a "-2" if a file name with "-1" already exists, and so on. When the target application 230 writes back the document to the source application 210, it may still have this modified file name so the matching manager 216 may not be able to match the document because it has a different file name than the name stored in the history table 520. This issue may be overcome as described above with respect steps 402 and 403 in the matching algorithm 400 of FIG. 4. Specifically, the file name which is passed during the write back may be checked to see if it contains a number according to the described format, and if so, the matching manager 216 may perform the history table 214 query with both the original file name and the file name stripped of the number format. If both the file names are found in the history table 520, the "older" duplicate may be ignored for further processing.

Finally, if exactly one matching entry is found for a recent "Open In" of a document with a given file name in the target application 230 from which the write back is received, the last modification date of the document in the document object table 510 may be compared with the open in date from the history table 520. If the last modification date is later than the open in date, the document may have been modified in the source application 210 in the meantime and the user may need to be prompted to decide on the resulting conflict. Namely, the user may decide that the change in the source application 210 may be discarded by overwriting the document with the written back document or that a new document may need to be created (i.e., cancelling the write back).

Aspects of the above may be implemented by software, firmware, hardware, or any combination thereof. FIG. 6 illustrates an example computer system 600 in which the above, or portions thereof, may be implemented as computer-readable code. Various embodiments of the above are described in terms of this example computer system 600.

Computer system 600 includes one or more processors, such as processor 604. Processor 604 can be a special purpose processor or a general purpose processor. Processor 604 is connected to a communication infrastructure 602 (for example, a bus or a network).

Computer system 600 also includes a main memory 606, preferably Random Access Memory (RAM), containing possibly inter alia computer software and/or data 608.

Computer system 600 may also include a secondary memory 610. Secondary memory 610 may include, for example, a hard disk drive 612, a removable storage drive 614, a memory stick, etc. A removable storage drive 614 may comprise a floppy disk drive, a magnetic tape drive, an optical disk drive, a flash memory, or the like. A removable storage drive 614 reads from and/or writes to a removable storage unit 616 in a well-known manner. A removable storage unit 616 may comprise a floppy disk, magnetic tape, optical disk, etc. which is read by and written to by removable storage drive 614. As will be appreciated by persons skilled in the relevant art(s) removable storage unit 616 includes a computer usable storage medium 618 having stored therein possibly inter alia computer software and/or data 620.

In alternative implementations, secondary memory 610 may include other similar means for allowing computer programs or other instructions to be loaded into computer system 600. Such means may include, for example, a removable storage unit 624 and an interface 622. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 624 and interfaces 622 which allow software and data to be transferred from the removable storage unit 624 to computer system 600.

Computer system 600 may also include an input interface 626 and a range of input devices 628 such as, possibly inter alia, a keyboard, a mouse, etc.

Computer system 600 may also include an output interface 630 and a range of output devices 632 such as, possibly inter alia, a display, one or more speakers, etc.

Computer system 600 may also include a communications interface 634. Communications interface 634 allows software and/or data 638 to be transferred between computer system 600 and external devices. Communications interface 634 may include a modem, a network interface (such as an Ethernet card), a communications port, a Personal Computer Memory Card International Association (PCMCIA) slot and card, or the like. Software and/or data 638 transferred via communications interface 634 are in the form of signals 636 which may be electronic, electromagnetic, optical, or other signals capable of being received by communications interface 634. These signals 636 are provided to communications interface 634 via a communications path 640. Communications path 640 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 616, removable storage unit 624, and a hard disk installed in hard disk drive 612. Signals carried over communications path 640 can also embody the logic described herein. Computer program medium and computer usable medium can also refer to memories, such as main memory 606 and secondary memory 610, which can be memory semiconductors (e.g. Dynamic Random Access Memory (DRAM) elements, etc.). These computer program products are means for providing software to computer system 600.

Computer programs (also called computer control logic) are stored in main memory 606 and/or secondary memory 610. Computer programs may also be received via communications interface 634. Such computer programs, when executed, enable computer system 600 to implement the present disclosure as discussed herein. In particular, the computer programs, when executed, enable processor 604 to implement the processes of aspects of the above. Accordingly, such computer programs represent controllers of the computer system 600. Where the disclosure is implemented using software, the software may be stored in a computer program product and loaded into computer system 600 using removable storage drive 614, interface 622, hard drive 612 or communications interface 634.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nanotechnological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

It is important to note that the particulars of FIG. 6 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

In the above description, numerous specific details are set forth to provide a thorough understanding of embodiments of the disclosure. One skilled in the relevant art will recognize, however, that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

The invention claimed is:

1. An apparatus comprising:
    a memory;
    a plurality of sandboxed applications stored in the memory;
    a plurality of document tables stored in the memory and associated with the applications, wherein each document table comprises information related to documents associated with a given application, wherein each document table is within the respective sandbox of the corresponding sandboxed application; and
    a processor to:
        search the document table associated with a source application if a new document is being passed from a target application back to the source application; and
        determine whether to overwrite an existing document with the new document being passed back based on information in the document table
    wherein, if the existing document is modified after the new document was initially passed to the target application, the processor prompts a user to store the new document at a desired location.

2. The apparatus of claim 1, wherein each document table includes a list of documents that are passed out of a corresponding application.

3. The apparatus of claim 2, wherein the information in each document history table comprises, for each document passed out of the corresponding application, a filename for the document, when the document was passed out, and which application the document was passed out to.

4. The apparatus of claim 2, further comprising a plurality of document object tables associated the applications, wherein the information in each document object table comprises, for each document, when the document was last modified.

5. The apparatus of claim 3, wherein the processor makes its determination based on the file name of the new document, when the new document was passed out, and which application the new document was passed out to.

6. The apparatus of claim 1, wherein, if the processor cannot make the determination to overwrite the existing document, the processor prompts a user to store the new document at a desired location.

7. The apparatus of claim 1, wherein the applications are mobile applications.

8. A method for implementation by one or more data processors forming part of at least one computing device, the method comprising:
  passing, by at least one data processor, a current version of a document from a source application to a target application, wherein the source application and the target application are sandboxed;
  storing, by at least one data processor, information related to the current version of a document in a document history table within a sandbox of the source application, wherein the information comprises the document's file name, when the document was passed from the source application to the target application, and a name of the target application;
  passing, by at least one data processor, a new version of the document back from the target application to the source application;
  searching, by at least one data processor, the document history table to match the new version of the document to an older version of the document;
  automatically determining, by at least one data processor, whether to overwrite the older version of the document with the new version of the document being passed back based on the information in the document history table; and
  prompting a user to store the new version of the document at a desired location if there are more than one potentially matching entries in the document history table.

9. The method of claim 8, wherein the document history table includes a list of documents that are passed out of the source application.

10. The method of claim 8, further comprising storing, by at least one data processor, when the older version of the document was last modified in a document object table.

11. The method of claim 8, further comprising determining if a file name of the new version of the document has a number appended to it, and if so, searching the document history table for a match using the file name without the number appended to it.

12. The method of claim 8, further comprising removing entries from the document history table that were passed out before a predetermined period of time.

13. The method of claim 8, wherein the document is passed between the target and source applications using an "Open In" function.

14. The method of claim 8, wherein the applications are mobile applications.

15. The method of claim 10, wherein, if the older version of the document is modified after the current version of the document was initially passed to the target application, prompting a user to store the new version of the document at a desired location.

16. A non-transitory computer readable medium containing program instructions, wherein execution of the program instructions by one or more processors of a computer system causes one or more processors to perform operations comprising:
  passing a current version of a document from a source application to a target application, wherein both applications are sandboxed wherein the source application and the target application are sandboxed;
  storing information related to the current version of the document in a document history table within a sandbox of the source application, wherein the information comprises the document's file name, when the document was passed from the source application to the target application, and a name of the target application;
  passing a new version of the document back from the target application to the source application;
  searching the document history table to match the new version of the document to an older version of the document;
  analyzing a list of potentially matching documents;
  removing potentially matching documents from the list based on when they were last passed out of the source application;
  automatically determining whether to overwrite the older version of the document with the new version of the document being passed back based on the information in the document history table;
  if the older version of the document is modified after the current version of the document was initially passed to the target application, prompting a user to store the document at a desired location; and
  determining if a file name of the new version of the document has a number appended to it, and if so, searching the document history table for a match using the file name without the number appended to it.

17. The non-transitory computer readable medium of claim 16, wherein the applications are mobile applications.

18. The non-transitory computer readable medium of claim 16, wherein each document table includes a list of documents that are passed out of a corresponding application.

19. The non-transitory computer readable medium of claim 18, wherein the information in each document history table comprises, for each document passed out of the corresponding application, a filename for the document, when the document was passed out, and which application the document was passed out to.

20. The non-transitory computer readable medium of claim 18, wherein there are a plurality of document object tables associated the applications, wherein the information in each document object table comprises, for each document, when the document was last modified.

* * * * *